Figure 1:
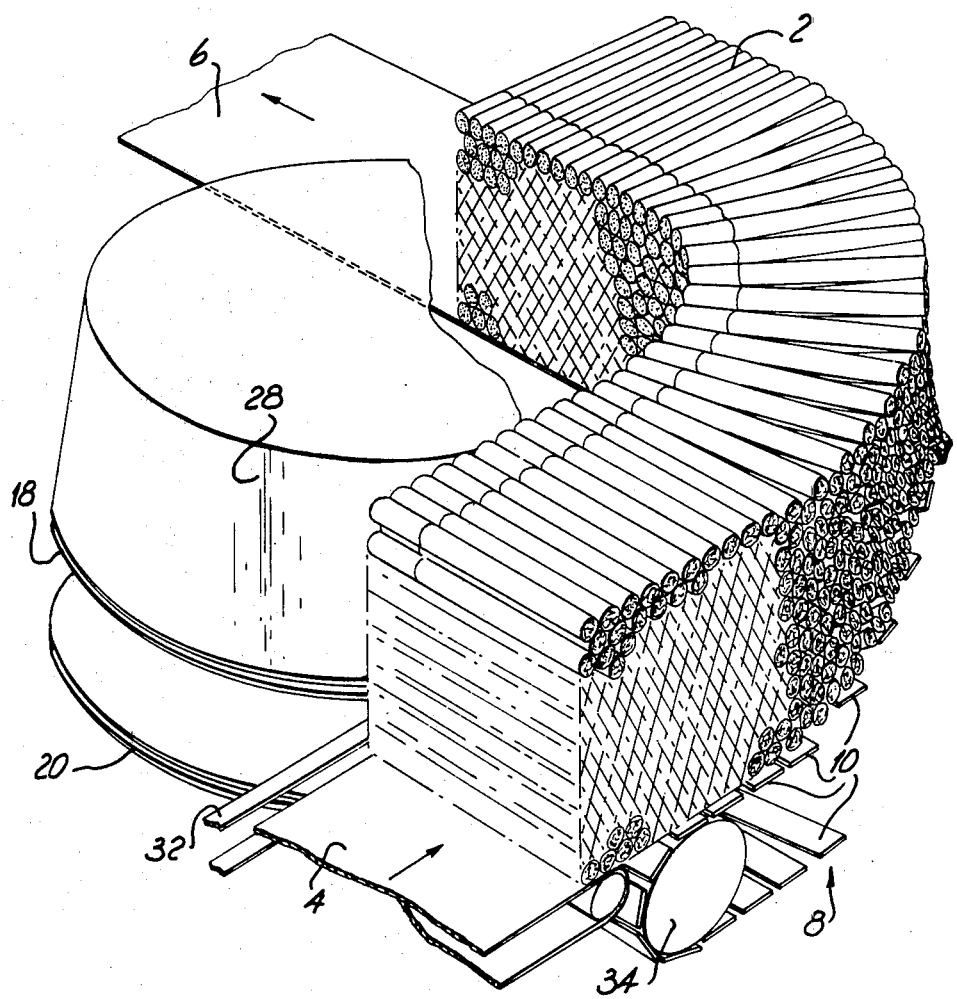

United States Patent [19]

Molins et al.

[11] 4,241,822

[45] Dec. 30, 1980

[54] APPARATUS FOR CONVEYING ROD-LIKE ARTICLES

[75] Inventors: Desmond W. Molins; Peter A. Clarke, both of London; Eric A. Luddington, Ringwood, all of England

[73] Assignee: Molins Limited, England

[21] Appl. No.: 958,720

[22] Filed: Nov. 8, 1978

[30] Foreign Application Priority Data

Nov. 22, 1977 [GB] United Kingdom ............... 48679/77

[51] Int. Cl.³ ...................... B65G 15/02; B65G 15/62; B65G 47/24; B65G 47/68
[52] U.S. Cl. .................................... 198/406; 198/448; 198/457; 198/831; 198/839; 198/951
[58] Field of Search ............... 198/406, 448, 831, 839, 198/841, 850, 457, 951

[56] References Cited

U.S. PATENT DOCUMENTS

| | | | |
|---|---|---|---|
| 2,800,218 | 7/1957 | Drouin | 198/831 |
| 4,042,112 | 8/1977 | Molins et al. | 198/448 X |

FOREIGN PATENT DOCUMENTS

| | | | |
|---|---|---|---|
| 994112 | 6/1965 | United Kingdom | 198/457 |
| 1082085 | 9/1967 | United Kingdom | 198/448 |

*Primary Examiner*—James L. Rowland
*Attorney, Agent, or Firm*—Craig & Antonelli

[57] ABSTRACT

Apparatus for conveying rod-like articles includes a conveyor particularly adapted for moving a stream of articles in stack formation around a curved path of small radius. The conveyor includes an endless conveyor carrying cantilevered slats and guided around a double curved path on the upper run of which the outer ends of the slats are elevated by a guide. On the curved path the outer side of the stream is elevated and moved at an increased speed by the slats. The conveyor may be used to turn articles in the stream through 180° prior to merging with another stream and is, therefore, usable in a "tip turner38 for attachment to a filter cigarette making machine.

44 Claims, 6 Drawing Figures

APPARATUS FOR CONVEYING ROD-LIKE ARTICLES

This invention relates to apparatus for conveying rod-like articles and is particularly concerned with apparatus for feeding such articles around a curved path. The invention is particularly useful in the tobacco industry, where it is often required to move a stack of cigarettes or filter rods between different processing machines.

When a stack of parallel rod-like articles is moved on a path which has a curved portion such that the articles are turned about a transverse axis, the outer ends of the articles on the curved portion become spaced further apart, thereby loosening the stack formation so that the height of the stack becomes lower on the outside of the curve. At the end of the curved portion of the stack should revert to its normal form with a relatively flat upper surface level, but this does not always happen properly, due to friction between the articles, and undesirable pressure can build up in the stack in consequence. Where the articles are filter cigarettes it is not normally possible to have the filter tips on the inside of a curve since the natural "tip build-up" increases the slope of the stack surface level on the curve to an unacceptably high value.

According to the present invention, apparatus for conveying rod-like articles comprises means for receiving a stream consisting of a stack of articles moving in a direction transverse to their lengths, means for conveying the stack around a curved path about a axis generally perpendicular to said direction, and guide means for raising the stack on the outside of the curve relative to the inside of the curve. Preferably said conveying means is arranged to move the ends of the articles on the outside of the curve at a higher speed than the ends of the articles on the inside of the curve. In one arrangement the guide means is arranged to support the conveying means at different levels relative to said axis at the outside and inside of said path. The apparatus may be arranged to deliver the stack along a substantially straight path following the curve, with no speed or height differential between the "outer" and "inner" parts of the stack. Preferably means is provided for progressively raising and lowering the stack on the outside of the curve.

The conveying means could comprise a pair of separate endless bands engaging the stack at spaced positions relative to the lengths of the articles. The band on the outside of the curve could travel faster than that on the inside and could be guided to an elevated level. In a preferred arrangement, however, the conveying means comprises an endless conveyor carrying slats which are movable relative to each other in transverse planes, i.e. so that they can become angularly spaced in their own plane or perpendicular to that plane. Thus, the slats may be cantilevered so that they are connected near corresponding ends to an endless drive belt and guided around a curved path with said ends on the inside of the curve. The outer ends of the slats then move more quickly as they become angularly spaced and may be moved by stationary guide means to an elevated position.

The present preferred arrangement, wherein the conveying speed for a stack is deliberately adjusted so that the appropriate speed differential for a curved path is provided, allows very tight turns to be negotiated. For example, the inner and outer radii of a curve could be one and two article lengths respectively. This would result in both the speed and the spacing of the outer ends of the articles being twice that of the inner ends, so that the outer ends fall conveniently between one another to retain a type of honeycomb formation. In that case, and in general, if the outside of the stack is raised by the appropriate amount, the upper surface of the stack can remain substantially level (preferably horizontal).

It will be appreciated that any change in formation of the stack such as should occur on entry into and exit from a curved path requires energy. This may be provided by gravity alone but when the friction between the articles is high it may be preferable to provide a pressure roller, band, or similar surface for the upper surface of the stack. This may be placed before and/or after and/or throughout the curved path.

The conveying means may be provided with means adapted to transmit additional drive to the stack, e.g. protrusions, as disclosed in British Pat. No. 1,453,191, or semi-cylindrical ribs, to provide more positive stack movement. The pressure means referred to above is also useful in this respect.

The present invention may be usefully applied to "tip-turning" of filter cigarettes. In a conventional way of making filter cigarettes a double length filter portion is spaced between and united to two axially aligned tobacco lengths and the resulting assemblage cut at its mid-point to produce two individual filter cigarettes. The formation of the assemblage and its subsequent division into filter cigarettes is normally carried out with the articles moving transverse to their lengths. Thus, a typical machine for assembling filter cigarettes delivers two separate rows of filter cigarettes with the filter ends of the cigarettes facing one another. Before the two rows can be combined for further handling of the cigarettes, it is desirable that the cigarettes in one row are turned so their filter ends face the same way as those in the other row; this process is "tip turning".

In one application of the present invention to tip turning the two rows of filter cigarettes are first formed separately into transversely-moving stacks by any convenient means and then one stack is passed around a 180° curved path by means of the present conveying apparatus. Said one stack is subsequently delivered so that it merges with the other stack, the cigarettes in said one stack having been turned so that their filter ends are on the same side as those of said other stack. This arrangement has the advantage that an effective and compact construction of the tip turner is possible.

A further aspect of the present invention, applicable to tip turning provides apparatus for conveying rod-like articles comprising conveyor means for conveying first and second streams consisting of stacks of rod-like articles in parallel directions transverse to the lengths of the articles, the articles in one stream having corresponding ends at one side of the stream relative to its direction of movement and the articles in the other stream having corresponding ends at the other side of the stream relative to its direction of movement, and transfer conveyor means for conveying articles of one stream to a position at which they are combined with articles from the other stream to form a combined stream in which corresponding ends of the articles are all at the same side of the stream, the transfer conveyor means including means for conveying a stream consisting of a stack of articles moving in a direction transverse to its length around a curved path about an axis generally perpendicular to said direction. Preferably said path extends at least about 180° around said axis.

In a preferred arrangement for tip turning by the present apparatus, cigarettes in the first stream are passed around a 180° vertical curve so that their direction of movement is reversed, either before or after movement on a substantially horizontal 180° curved path of the conveying apparatus. Thus, the first stream may be moved to a position in vertical alignment with the second stack but at a different level. In this way the path of the second stream can be straight. While the movement of the first stream around a horizontal curved path is capable of turning the cigarettes so that their filter ends face the same way as those of the second stream, use of a horizontal conveyor means to achieve this will result in the cigarettes of the two streams travelling in opposite directions. It is sometimes preferable to merge streams while they are travelling in substantially the same direction, hence the provision of a path reversal: this could be provided in the path of the second stream instead of the first stream. Alternatively the streams could be merged from substantially opposite directions at different levels or at a T-junction.

Figure 2:
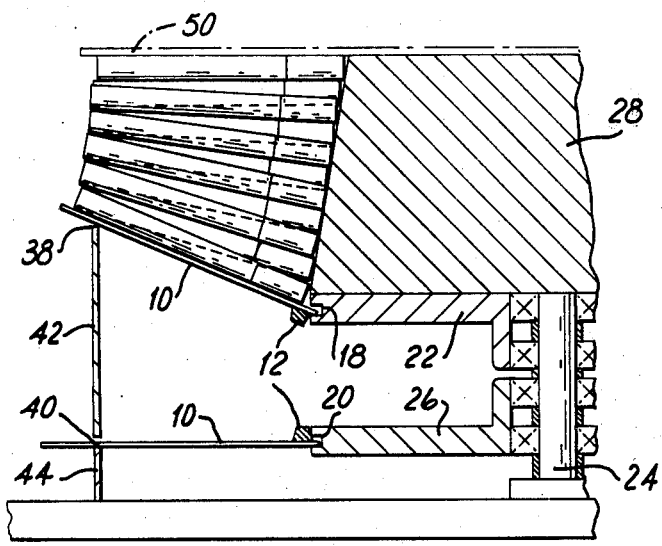
Figure 3:
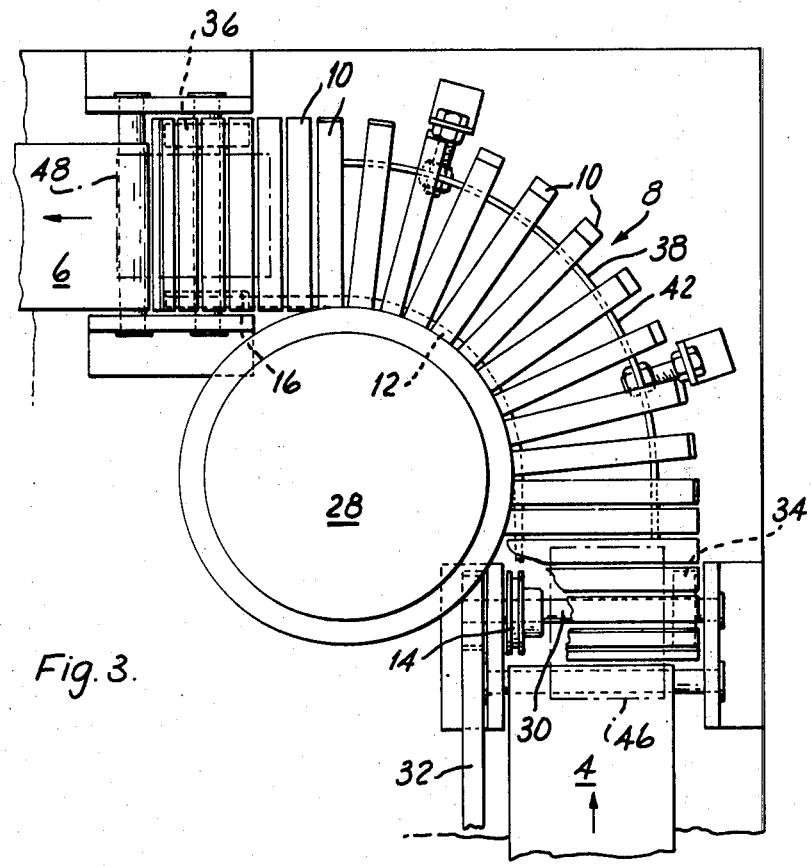
Figure 4:
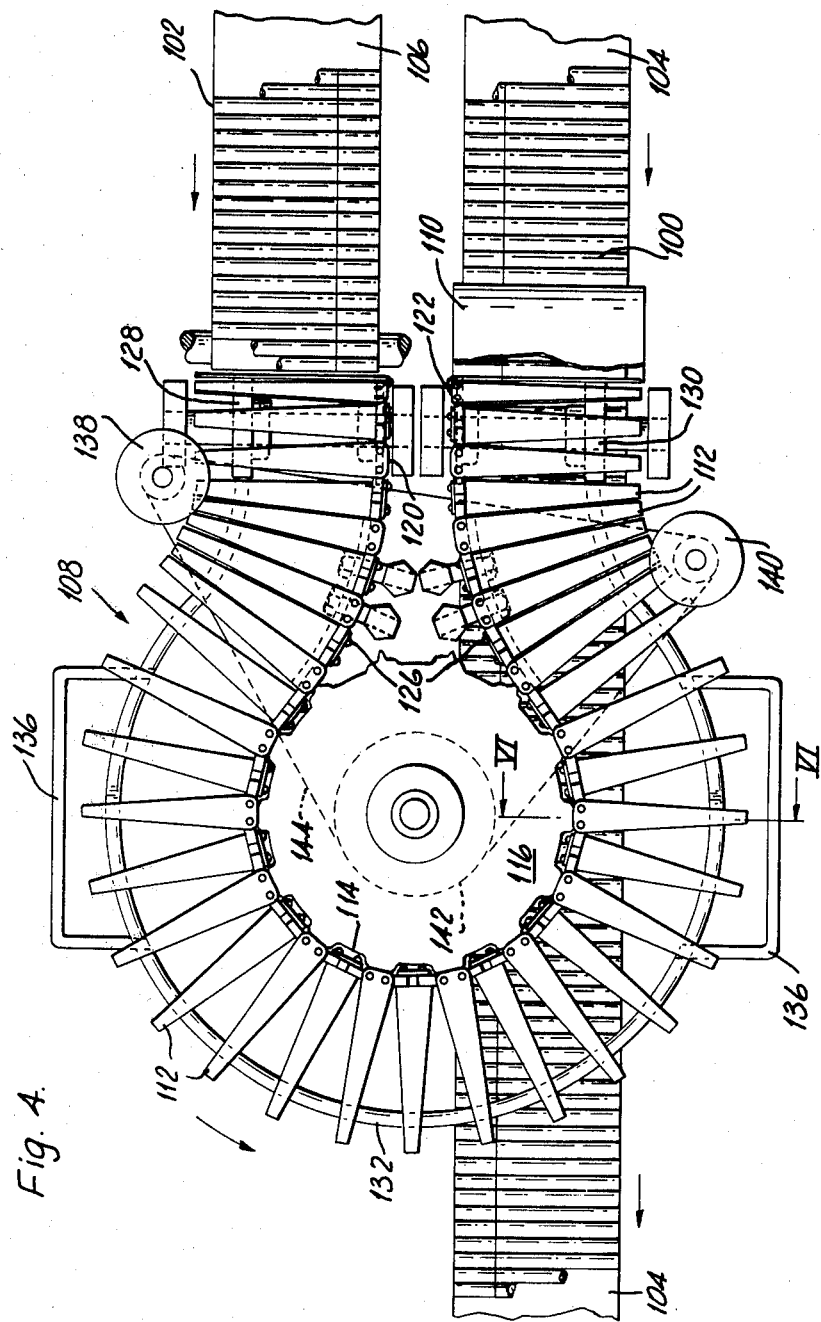
Figure 5:
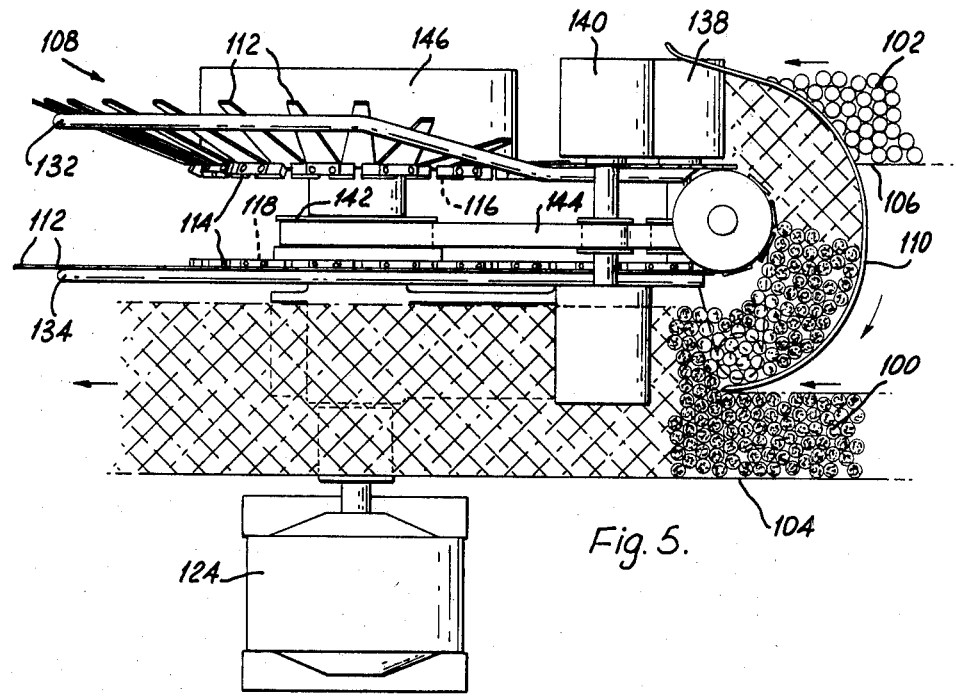
Figure 6:
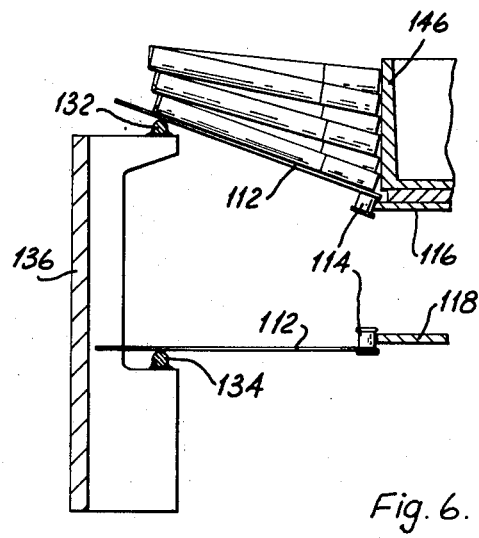

The invention will now be further described, by way of example only, with reference to the accompanying diagrammatic drawings, in which:

FIG. 1 is a perspective view of conveyor means for a stack of filter cigarettes, FIG. 2 is a transverse sectional view of the conveyor means of FIG. 1, FIG. 3 is a plan view of the conveyor means of FIG. 1, FIG. 4 is a plan view of further apparatus for conveying stacks of filter cigarettes, FIG. 5 is a side view of the apparatus of FIG. 4, and FIG. 6 is a sectional view of the line VI—VI of FIG. 4, Referring to FIGS. 1 to 3, a stream 2 comprising a substantially continuous stack of filter cigarettes is conveyed in a direction transverse to the lengths of the cigarettes by a first endless band conveyor 4. The stream 2 is transferred from the conveyor 4 to a second endless band conveyor 6 having a conveyance direction disposed at about 90° to that of the conveyor 4 by means of a further conveyor 8. The conveyors 4, 6 and 8 may form part of a conveyor system linking one or more cigarette making machines and one or more cigarette packing machines.

The conveyor 8 comprises a plurality of slats 10 attached near corresponding ends to an endless belt 12. The belt 12 passes around a first pulley 14 near the end of the first conveyor 4 and also around a second pulley 16 near the end of the second conveyor 6. The pulleys 14 and 16 are disposed in planes at about 90° to one another and the conveyor 8 is guided around a curved path between said pulleys by engagement of the ends of the slats 10 nearest the belt 12 in upper and lower channels 18, 20 respectively. The upper channel 18 is formed in the periphery of an upper circular disc 22 rotatable about a vertical spindle 24. Similarly the lower channel is formed in the periphery of a lower circular disc 26, also rotatable on the spindle 24. A frustum 28 is connected to the upper surface of the upper disc 22.

The pulley 14 is mounted on a spindle 30 which carries a further pulley for a drive belt 32 and also a cylinder 34 for supporting the free ends of the slats 10 in the region of the spindle 30. The pulley 16 is coaxial with a cylinder 36 for supporting the free ends of the slats 10. Between the cylinders 34 and 36 the positons of the free ends of the slats 10 are determined by guide surfaces 38, 40, respectively formed by the upper edges of curved plates 42 and 44. The surface 40 is substantially horizontal and is arranged so that the slats 10 remain horizontal on the lower run of their path. The surface 38 is upwardly curved so that the slats 10, which are horizontal in the region of cylinder 34, become progressively inclined as their free ends are lifted by the surface 38 on movement away from the cylinder 34. The lift provided by the surface 38 and hence the inclination of the slats 10 reaches a maximum when the position of minimum radius of the curved path of conveyor 8 is reached after which the free ends are progressively lowered so that the slats become horizontal again adjacent the cylinder 36. The belt 12 is capable of twisting to allow the slats 10 to reach their position of maximum inclination. In general, the amount of lift provided by the surface 38 should vary with the curvature of the stack path.

The stream 2 of cigarettes is received from conveyor 4 by conveyor 8 on parallel adjacent slats 10. The curved path of conveyor 8 determined by channels 18, 20 results in a speed differential along the slats, the outer free ends travelling more quickly than the ends adjacent the belt 12. This speed differential is transmitted to the stream 2 on the slats 10 so that the outer ends of the cigarettes become more spaced apart than the inner ends and the height of the stream consequently tends to become lower on the outside of the curve. This is compensated by the inclination of the slats 10 to such an extent that the upper surface of the stream 2 remains substantially level. The inner ends of the cigarettes are supported against the rotatable surface of the frustum 28. On completion of the curve on conveyor 8 the speed differential and the inclination of the slats is reduced to zero so that the stream returns to its normal stack formation for transfer to the conveyor 6.

In order to ensure that the speed differential is adequately transmitted to the stream 2 part or all of the upper surface of some or all of the slats 10 may be formed with protrusions of the kind disclosed, for example, in British Pat. No. 1,453,191, or with semi-cylindrical ribs. The upper surface of a slat could be semi-cylindrical. Alternatively, or additionally, an upper pressure roller, belt, or other surface could be provided in the transfer region between conveyors 4 and 8 to press down on the upper surface of the stream 2. Similarly such means could also be provided at the transfer region between the conveyor 8 and conveyor 6 to ensure a return to the normal stack formation. Pressure means is indicated generally at 46 and 48 in FIG. 3.

Some form of control for the upper surface level of the stream could be desirable throughout the path on conveyor 8. The frustum 28 could carry an upper disc (indicated at 50 in FIG. 2) for this purpose.

FIGS. 4, 5 and 6 show apparatus arranged downstream of a machine for assembling filter cigarettes. This machine accepts tobacco lengths from a cigarette making machine and forms assemblages comprising two axially spaced tobacco lengths separated by a double length filter portion. The assemblages are united in the machine, cut at their mid-points and spaced apart to produce two rows of transversely-moving individual filter cigarettes. These rows are converted into streams comprising substantially continuous stacks by reducing the conveying speed. For example, cigarettes from each row may separately be stripped from a drum of the assembling machine and delivered onto a conveyor band. Formation of a continuous stack on each of the conveyor bands may be controlled by a sensor which adjusts the band speed according to the height of the stack being formed.

FIGS. 4 and 5 show streams 100, 102 formed in this way. As shown in FIG. 5, the stream 102 is at a higher level than the stream 100; the streams may be formed at different levels or subsequently moved relative to one another. The reason for the level difference will become apparent later.

The stream 100 is conveyed by a lower conveyor band 104. The stream 102 is conveyed by an upper band conveyor 106 which delivers the stream onto a slat conveyor 108. The stream 102 is turned horizontally through 180° on the slat conveyor 108 and also laterally displaced, so that the cigarettes are above and in alignment with the cigarettes in the stream 100 on conveyor 104. Moreover, as a result of the horizontal turn on slat conveyor 108, the filter tips of the cigarettes in both streams are at the same side. After passage on the slat conveyor 108 the stream 102 is moved by means of a curved guide plate 110 onto the stream 100 on conveyor 104, so that this conveyor subsequently moves a combined stream of double height.

The slat conveyor 108 comprises slats 112 cantilevered on a chain 114. The chain 114 passes around upper and lower sprockets, 116, 118 respectively, rotatable about a common vertical axis, and also around sprockets 120, 122, rotatable about a common horizontal axis. The lower sprocket 118 is driven by a motor 124 whereas the upper sprocket 116 is freely rotatable. Curved guides 126 control the path of the chain 114 between the sprockets 116, 118 and sprockets 120, 122.

The free ends of the slats 112 are supported in the regions of the sprockets 120 and 122 by coaxial cylinders 128 and 130, respectively. The free ends of the slats 112 connected to the part of the chain 114 on the upper sprocket 116 are supported by a guide rod 132 which has an elevated intermediate portion corresponding to the curved path of the chain around the sprocket. A further guide rod 134, which does not have an elevated portion, is provided for supporting the ends of the slats 112 connected to the part of the chain 114 on the lower sprocket 118. The rods 132, 134 are supported by opposed brackets 136.

Alignment of the stream 102 as it passes to and from the slat conveyor 108 is aided by guide rollers 138, 140, which are driven by the motor 124 via a pulley 142 and belt 144. The inside of the stream is supported while on the slat conveyor 108 by a drum 146 rotatable with the upper sprocket 116.

The movement of the stream 102 on the slat conveyor 108 is analogous to that of the stream 2 in the apparatus of FIGS. 1 to 3. The apparatus of FIGS. 4 to 6 could be modified so that the slat conveyor is similar to that of FIGS. 1 to 3.

Instead of cantilevered slats, a stream of rod-like articles could be supported on a curved path by a pair of bands, the outer band being elevated and driven faster than the inner band. Alternatively, the inner ends of the articles could be supported by a flange on the central drum while the outer ends alone are supported by a driven elevated band. Bands and guide means similar to those employed in the apparatus disclosed in German OS No. 2,419,375 could be used.

We claim:

1. Apparatus for conveying rod-like articles comprising means for moving a stream consisting of a stack of rod-like articles in a direction transverse to their lengths, means for conveying the stack around a curved path about an axis generally perpendicular to said direction, and guide means for elevating said conveying means so as to raise the stack on the outside of the curve relative to the inside of the curve.

2. Apparatus as claimed in claim 1, wherein said conveying means is constructed so that the ends of the articles on the outside of the curve move at a higher speed than the ends of the articles on the inside of the curve.

3. Apparatus as claimed in claim 1, wherein the guide means includes means for supporting the conveying means at different levels relative to said axis at the outside and inside of said path.

4. Apparatus as claimed in claim 1, including means for delivering a stream from said curved path, wherein said conveying means includes a conveyor extending along said curved path and said guide means includes means for raising the outer edge of said conveyor to elevate the stack on the outside of the curved path on transfer from said receiving means and for lowering the outer edge of said conveyor to correspondingly lower the stack on the outside of the path on transfer to said delivering means.

5. Apparatus as claimed in claim 1, wherein the conveying means comprises an endless conveyor carrying slats which are movable in transverse planes relative to one another.

6. Apparatus as claimed in claim 5 wherein said slats are attached to said endless conveyor near their inner ends, the outer ends of the slats being supported by said guide means.

7. Apparatus as claimed in claim 2, wherein the conveying means comprises a pair of endless conveyors which engage the stack at spaced positions relative to the lengths of the articles.

8. Apparatus as claimed in claim 1, including a surface for controlling the upper part of the stack over at least part of the curved path.

9. Apparatus as claimed in claim 8, wherein said surface is arranged so that the stack is compressed between said surface and the conveying means.

10. Apparatus as claimed in claim 3, wherein the conveying means is provided with means adapted to engage articles of the stack to positively drive said stack.

11. Apparatus as claimed in claim 1, including a surface, movable with said conveying means, for supporting the inner side of the stack on said curved path.

12. Apparatus as claimed in claim 11, wherein said surface is inclined inwardly towards said axis in a direction upwards from said conveying means.

13. Apparatus as claimed in claim 2, wherein the curved path has a radius of about one article length.

14. Apparatus as claimed in claim 1, wherein said axis is substantially vertical and said guide means is arranged to maintain the upper surface of said stack on the curved path substantially horizontal.

15. Apparatus for conveying rod-like articles comprising conveyor means for conveying first and second streams consisting of stacks of rod-like articles in substantially-parallel directions transverse to the lengths of the articles, the articles in one stream having corresponding edges at one side of the stream relative to its direction of movement and the articles in the other stream having corresponding ends at the other side of the stream relative to its direction of movement, and transfer conveyor means for conveying articles of one stream to a position at which they are combined with articles from the other stream to form a combined stream, the transfer conveyor means including means for supporting and conveying a stream consisting of a stack of articles moving in a direction transverse to the lengths of the articles on a curved path about an axis generally perpendicular to said direction and to said articles, and means for altering the inclination of said support and conveying means relative to said axis so that the stack is supported and conveyed on at least part of said curved path with its outer side at an elevated level relative to its inner side.

16. Apparatus as claimed in claim 15, wherein said path extends at least about 180° around said axis.

17. Apparatus as claimed in claim 16, wherein said first and second streams are at different levels and said combined streams is at the level of said second stream.

18. Apparatus as claimed in claim 17, wherein the first stream is conveyed by said transfer conveyor means and delivered over said second stream to form said combined stream.

19. Apparatus as claimed in claim 15, wherein said inclination altering means comprises guide means for raising said supporting and conveying means on the outside of the curved path relative to the inside of the curved path.

20. Apparatus as claimed in claim 19 wherein said transfer conveyor means is arranged to move the supporting and ends of the articles on the outside of said curved path at a higher speed than the ends of the articles on the inside of said path.

21. Apparatus as claimed in claim 20, wherein the guide means is arranged to support the conveying means at different levels relative to said axis at the outside and inside of said path.

22. Apparatus for conveying a stack of rod-like articles in a direction transverse to the lengths of said articles including endless conveyor means having a support surface for said stack, said endless conveyor means defining a path which curves about an axis generally perpendicular to said direction and said articles, and means for changing the inclination of said support surface relative to said axis on said path.

23. Apparatus as claimed in claim 22, wherein said path includes spaced first and second sections at which said support surface is generally perpendicular to said axis and an intermediate portion in which said inclination changing means is arranged to progressively raise and lower in a direction generally parallel to said axis an outer part of said surface relative to an inner part of said surface.

24. Apparatus for conveying a stack of rod-like articles in a direction transverse to the lengths of the articles, comprising first and second co-planar conveyors for conveying said stack, endless conveyor means having a support surface for said stack and defining a curved path for said stack between said first and second conveyors, said curved path having an axis generally perpendicular to said plane and said support surface lying substantially in said plane adjacent said first and second conveyors, and guide means for moving at least part of said surface out of said plane on said curved path so that the stack is conveyed on said path with at least some of the articles substantially inclined to said plane and with the outer ends of said articles elevated relative to the inner ends thereof.

25. Apparatus as claimed in claim 24, wherein said support surface includes portions which are relatively movable in a direction transverse to said plane.

26. Apparatus as claimed in claim 25, wherein said support surface includes a plurality of portions which extend away from said axis on said curved path, said portions being interconnected at inner regions only so that at least the ends of said portions remote from said axis are not directly connected to each other.

27. Apparatus for conveying a stack of rod-like articles in a direction transverse to the lengths of the articles, comprising first conveyor means for conveying a stack of articles in a first direction, second conveyor means for conveying said stack in a second direction, and transfer conveyor means for conveying the stack from the first conveyor means to the second conveyor means and defining a path which is curved about an axis generally perpendicular to the direction of movement of the stack on said path and to the articles in said stack, said transfer conveyor means including means for progressively twisting the stack about its direction of movement so that on said path one side of the stack is elevated relative to the other side.

28. Apparatus for conveying a stack of rod-like articles in a direction transverse to the lengths of the articles, comprising first conveyor means for conveying a stack of articles in a first direction, second conveyor means for conveying the stack in a second direction, and transfer conveyor means for conveying the stack from the first conveyor means to the second conveyor means and defining a substantially-horizontal path which is curved about a substantially vertical axis, said transfer conveyor means including means adapted to change the formation of said stack on said path so that the upper surface of said stack on said path remains substantially horizontal and the lower surface is inclined to the horizontal.

29. Apparatus for conveying rod-like articles comprising means for receiving a stream consisting of a stack of articles moving in a direction transverse to their lengths, means for conveying the stack around a curved path about an axis generally perpendicular to said direction and said articles, and support means for the stack on said path arranged so that for at least part of said path the outer side of the stack is supported at a level which is elevated in a direction parallel to said axis relative to the level at which the inner side of the stack is supported.

30. Apparatus as claimed in claim 29, including means for delivering a stream from said curved path, wherein said support means is arranged progressively to increase said elevation of the outer side of the stack on transfer from said receiving means and progressively to decrease said elevation on transfer to said delivering means.

31. Apparatus for conveying rod-like articles, comprising means for receiving a stream consisting of a stack of substantially-horizontal articles moving in a direction transverse to their lengths, means for conveying the stack around a curved path having a substantially-vertical axis, and guide means for raising the conveying means on the outside of the curved path relative to the inside of the path, said guide means being arranged to maintain the upper surface of said stack on the curved path substantially horizontal.

32. Apparatus for conveying rod-like articles comprising means for moving a stream consisting of a continuous stack of rod-like articles in a direction transverse to their lengths; means for conveying the stack around a curved path about an axis generally perpendicular to said direction, including an endless drive member extending along said curved path and a plurality of elongated support members for said stack secured to said drive member so as to extend generally transverse thereto, said support members being pivotable about said drive member substantially independently of one another; and guide means for pivoting said support members so as to raise the stack on the outside of the curve relative to the inside of the curve.

33. Apparatus as claimed in claim 32, wherein each of said support members are secured to said drive members at one end thereof, the other end of said support members being supported by said guide means.

34. Apparatus as claimed in claim 32, wherein said drive member comprises a belt which is capable of being twisted to permit pivoting of said suppport members.

35. Apparatus as claimed in claim 32, wherein said drive member comprises a chain which is capable of being twisted to permit pivoting of said support members.

36. Apparatus as claimed in claims 33, 34 or 35, wherein said guide means includes means defining a track disposed along the inside of said curved path and within which one end of at least some of said support members are engaged.

37. Apparatus as claimed in claim 32, including a surface, movable with said conveying means, for supporting the inner side of the stack on said curved path.

38. Apparatus for conveying filter cigarettes comprising first and second conveyor means for moving first and second streams consisting of stacks of filter cigarettes along parallel paths in the same direction transverse to the lengths of the cigarettes, the cigarettes in said first stream being oriented oppositely to the cigarettes in said second stream; and transfer conveyor means for conveying the cigarettes in said first stream carried by said first conveyor means to said second stream carried by said second conveyor means while reorienting said first stream to correspond to the orientation of said second stream, including first means for conveying said first stream along a curved path about a first axis generally perpendicular to the direction of movement of said first conveyor means and to the axis of said cigarettes, and second means for elevating said first means along at least a portion of said curved path so as to raise said first stream on the outside of the curve relative to the inside of the curve.

39. Apparatus as claimed in claim 38, wherein said transfer conveyor means further includes third means for conveying said first stream around a second axis perpendicular to said first axis and parallel to the axis of said cigarettes.

40. Apparatus as claimed in claim 39, wherein said first means is disposed of said third means in the direction of movement of said first stream.

41. Apparatus as claimed in claim 39, wherein said first means is disposed downstream of said third means in the direction of movement of said first stream.

42. Apparatus as claimed in claim 38, further including means for guiding said second stream about a second axis perpendicular to said first axis and parallel to the axis of said cigarettes.

43. Apparatus as claimed in claim 38, wherein said first means includes an endless drive member extending along said curved path and a plurality of elongated support members for said stream extending across said curved path and being secured to said drive member so as to be pivotable about said drive member.

44. Apparatus as claimed in claim 43, wherein said second means includes means defining a track disposed along the inside of said curved path and within which one end of at at least some of said support members are engaged and means for supporting the other end of said support members to effect a pivoting thereof thereby tilting said first stream as it passes along said curved path.

* * * * *